United States Patent Office
3,720,746
Patented Mar. 13, 1973

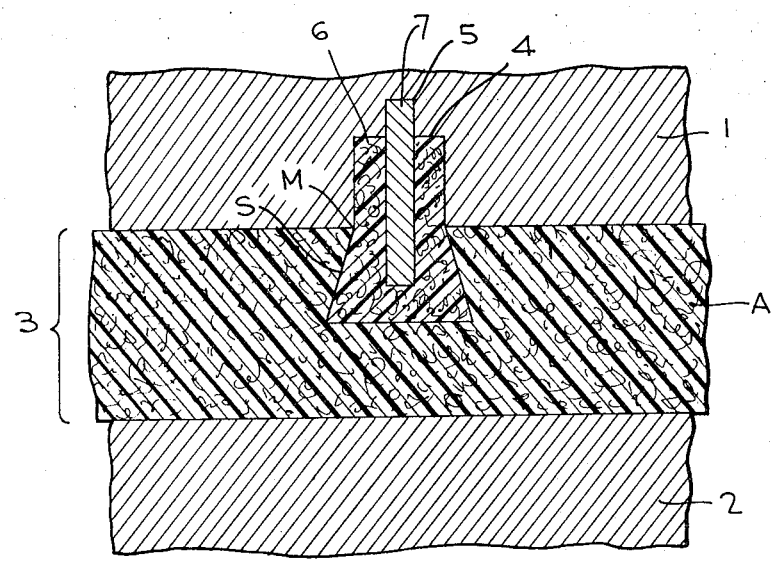

3,720,746
METHOD FOR MOLDING UNDERCUT SLOTS IN MOTOR VEHICLE BODY PARTS
Kurt Schwenk and Hermann Hablitzel, Wolfsburg, Germany, assignors to Volkswagenwerk Aktiengesellschaft, Wolfsburg, Germany
Continuation-in-part of abandoned application Ser. No. 773,409, Nov. 5, 1968. This application Jan. 12, 1971, Ser. No. 105,799
Int. Cl. B29c 1/12
U.S. Cl. 264—219                            1 Claim

ABSTRACT OF THE DISCLOSURE

In a mold comprising separable mold parts, one of the mold parts is formed with an elongated first slot opening into the mold cavity and a similarly elongated second slot in the bottom of the first slot and of narrower width than the first slot. A substantially hard non-deformable stiffening member is removably held io the second slot with a free edge projecting into the mold cavity, and a deformable profile strip of U-shaped cross-section is supported on this member with its closed maximum width portion extending across the free edge of said member within the mold cavity and with its legs received in the first slot on opposite sides of said member. When an article is then formed in the mold cavity and stripped from the mold, it withdraws both profile strip and the stiffening member from the respective slots, whereupon removal of the stiffening member from the deformable profile strip allows substantial deformability of the profile strip into the space formerly occupied by the stiffening member so that the profile strip may then be withdrawn through the narrow open side of the undercut slot formed by it in the article.

---

This application is a continuation-in-part of our prior co-pending application, Ser. No. 773,409, filed Nov. 5, 1968, now abandoned.

This invention relates to an improved method for molding plastic articles with undercut slots therein.

In forming motor vehicle parts by reaction injection molding process from a conventional plastic foam formed by reaction between the two components of the plastic foam, the intermixed components begin to react after relatively short period of time with consequent swelling and filling of the mold cavity at a pressure which may be in the order of about 1 kg./cm.$^2$.

In the formation of such plastic parts having large surface areas and complicated shapes, it has been found to be particularly difficult to form undercut slots in such parts, due to the difficulty of making adequate provision for same in the configuration of the mold parts.

With these considerations in mind, the primary objects of the invention are to provide a new and simplified method for molding vehicle body parts or other articles in a manner to define therein undercut grooves which may be of varying shapes and dimensions.

It is further an object to provide such a process wherein, by a minimum number of simple steps, and by the use of simple core members, the slots may be defined and the core members readily removed through the open narrow or constricted side of the undercut slot or slots in the molded articles.

To facilitate a rapid understanding of the invention, there is shown in section in the accompanying figure of drawing, a portion of a mold having separable mold parts and including the improved features adapting it for carrying out the process of the present invention.

Referring now in detail to the drawing, the portion of the mold therein illustrated, is formed of separable mold parts 1 and 2 which may be conventional in all respects, except as herein described, and which define between them the mold cavity 3 in which a suitable plastic foam is injected to form a molded article such as a plastic motor vehicle part A. The part A is formed with an undercut slot S which is shown in cross-section and which may be of substantial length. The narrowest portion of the slot S is at its open side or mouth M at the surface of the article A.

In order to mold such a slot S into the article A, we form the mold part 1 with a suitable elongated first slot 4 opening into the mold cavity 3 and having relatively opposed parallel side walls substantially normal to the inner face or surface of the mold part 1 within the mold cavity 3. A second elongated slot 5 which is narrower than the first slot is formed in the bottom of the latter and it also has relatively opposed parallel side walls normal to the inner cavity-defining surface area of the mold part 1.

The mold core for defining the undercut slot S in the molded article A comprises separable portions, including a profile strip 6 of readily deformable material, such as a suitable foam plastic, of dove tailed or wedge like cross-seciton as shown, having its widest or broadest portion at its closed inner end, and a stiffening member or insert 7 of a relatively non-deformable, comparatively harder material received between the relatively spaced legs of the strip 6.

In carrying out the invention, after forming the first slot 4 in the mold part 1, and the second slot 5 in the bottom of the first slot, the composite mold core 6, 7 is supported in operative position in said slots. In particular, the non-deformable elongated stiffening member or insert 7 is disposed and frictionally retained in the second slot 5, being proportioned to project completely through the first slot with its free edge extending substantially into the mold cavity 3.

The deformable profile strip 6 is assembled and supported on the stiffening member 7 with its maximum width closed end portion extending across the free end of the stiffening member or strip 7 within the mold cavity, and with its relatively spaced apart sides or legs extending and frictionally retained in the first slot 4 on opposite sides of the stiffening strip 7. It will be noted, particularly, that the profile strip is of externally tapered cross-sectional configuration so that the external surfaces of its legs converge in a direction away from its maximum width free edge portion toward the inner face of the mold. The relatively uniform thickness free edge portions of the legs are inserted and frictionally retained in the first slot 4 on opposite sides of the stiffening strip or member 7 and fully occupy the first slot to prevent any flow of plastic material from the mold cavity into such slot.

As thus arranged, it will be apparent that the stiffening member 7 fully occupies the space between the legs of the profile strip 6 and, being relatively or substantially incompressible, resists inward deformation of the profile strip by pressures within the mold cavity during the molding process.

Thereafter, in accordance with the process of the invention, during the molding of an article in the cavity 3, the composite core structure defined by 6 and 7 serves to define an undercut slot S in the molded article A with the narrowest portion of the slot along its open side or mouth M at the surface of the article.

After molding of the article, the mold parts 1 and 2 are separated, thereby withdrawing the stiffening member 6 and profile strip 7 from the first and second slots 4 and 5 and leaving them retained in the undercut slot S of the article.

Thereafter the stiffening member 7 is withdrawn from between the opposed legs of the U-cross-section profile strip 6 to allow deformability or flexing of the material of said strip into the space formerly occupied by the member 7, while the strip 6 itself is withdrawn through the narrow or constricted open-side M of the undercut slot. As a result of the withdrawing motion, the relatively converging sides or side walls of the undercut slot S exert a camming action tending to laterally compress the wider closed end portion of the strip as it is withdrawn through the open side M of the slot.

It is to be understood that the drawing and descriptive matter are in all cases to be interpreted as merely illustrative of the principles of the invention, rather than as limiting the same in any way, since various changes may be made without departing from the invention as defined in the accompanying claim.

Having thus described our invention, we claim:

1. A method of molding an undercut slot in a motor vehicle part in a mold cavity defined by separable mold parts, comprising the steps of:

forming a first slot in one of said parts, opening into the mold cavity;

forming a second relatively narrower slot in the bottom of said first slot and coextensive therewith; removably disposing in said second slot a substantially non-deformable elongated member with a free edge of said member projecting through said first slot and into the mold cavity;

supporting on said member a deformable profile strip of dove tailed shape in cross-section, having a maximum width closed end portion extending across the free edge of said supporting strip within the mold cavity, and relatively spaced legs diminishing in thickness from said maximum width portion toward the surface of said mold cavity, and inserting the said legs of said profile strip into the first slot on opposite sides of said non-deformable member;

molding an article in said cavity;

withdrawing said member and said profile strip from the respective slots by stripping the molded article from the mold;

removing said member from said deformable profile strip to allow substantial deformability of the material of said deformable profile strip into the space formerly occupied by said member; and withdrawing said deformable profile strip through the narrow open side of the undercut slot formed by it in the article.

References Cited

UNITED STATES PATENTS

| | | | |
|---|---|---|---|
| 2,475,435 | 7/1949 | Rasmussen | 25—44 |
| 2,554,110 | 5/1951 | Lemm | 25—128 D |
| 2,427,144 | 9/1947 | Jansen | 264—274 X |

ROBERT F. WHITE, Primary Examiner

R. R. KUCIA, Assistant Examiner

U.S. Cl. X.R.

264—313, 318, 334